United States Patent [19]

Vecera, Jr.

[11] Patent Number: 4,526,030

[45] Date of Patent: Jul. 2, 1985

[54] MULTI-FUNCTIONAL TIRE TESTING TOOL

[76] Inventor: Guy L. Vecera, Jr., 1625 Chester Blvd., Richmond, Ind. 47374

[21] Appl. No.: 495,838

[22] Filed: May 18, 1983

[51] Int. Cl.³ ............................................. B60C 23/02
[52] U.S. Cl. ................................. 73/146.8; 33/169 B; 73/744
[58] Field of Search ................... 73/146.8, 146.2, 744; 33/169 B

[56] References Cited

U.S. PATENT DOCUMENTS 3,696,668 10/1972 Patrick ............................. 73/146.8
3,852,839 12/1974 Blessing ........................... 73/146.8

Primary Examiner—Donald O. Woodiel
Attorney, Agent, or Firm—Frost & Jacobs

[57] ABSTRACT

The improved tire gauge of the present invention provides a multi-functional tire testing tool capable of determining the tire tread depth, measuring the tire pressure, and removing and replacing the tire stem cores from the tire valve. The tire tread depth checker and a stem removing element are attached to a conventional tire gauge. The tire tread depth check has an indicator probe which is positionable between the tire treads and which slidably engages the cylindrical body of the conventional tire gauge. A linear scale on the cylindrical body cooperates with the probe to provide a measurement of the tire tread thickness. A stem core removing element is attached to the top portion of the tire valve engaging head of the conventional tire gauge. The stem core removing and replacing element has a rod like element with an axial bore and slot at the bore opening for receiving the tire stem.

9 Claims, 7 Drawing Figures

U.S. Patent  Jul. 2, 1985  Sheet 1 of 2  4,526,030
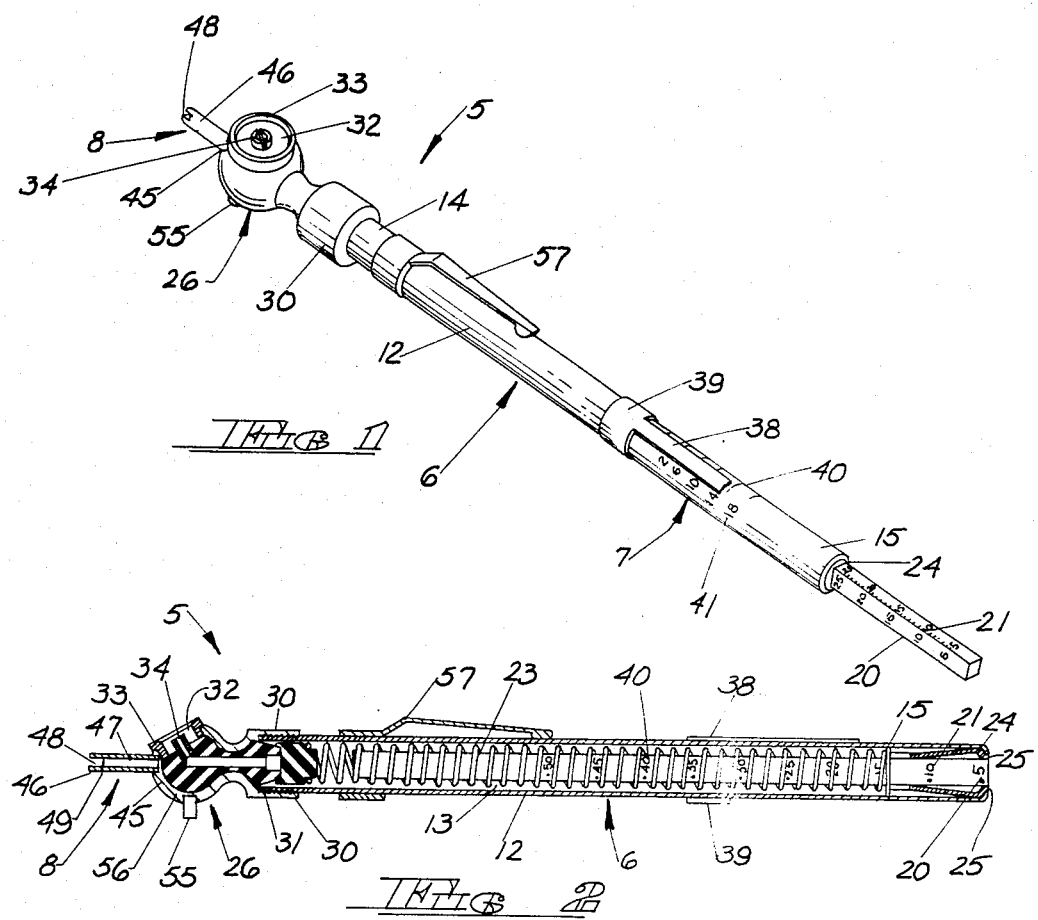
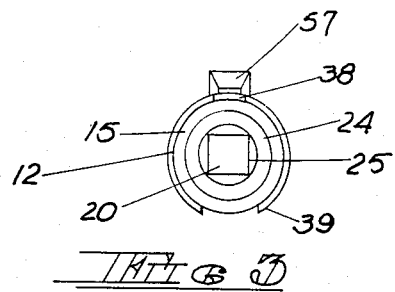

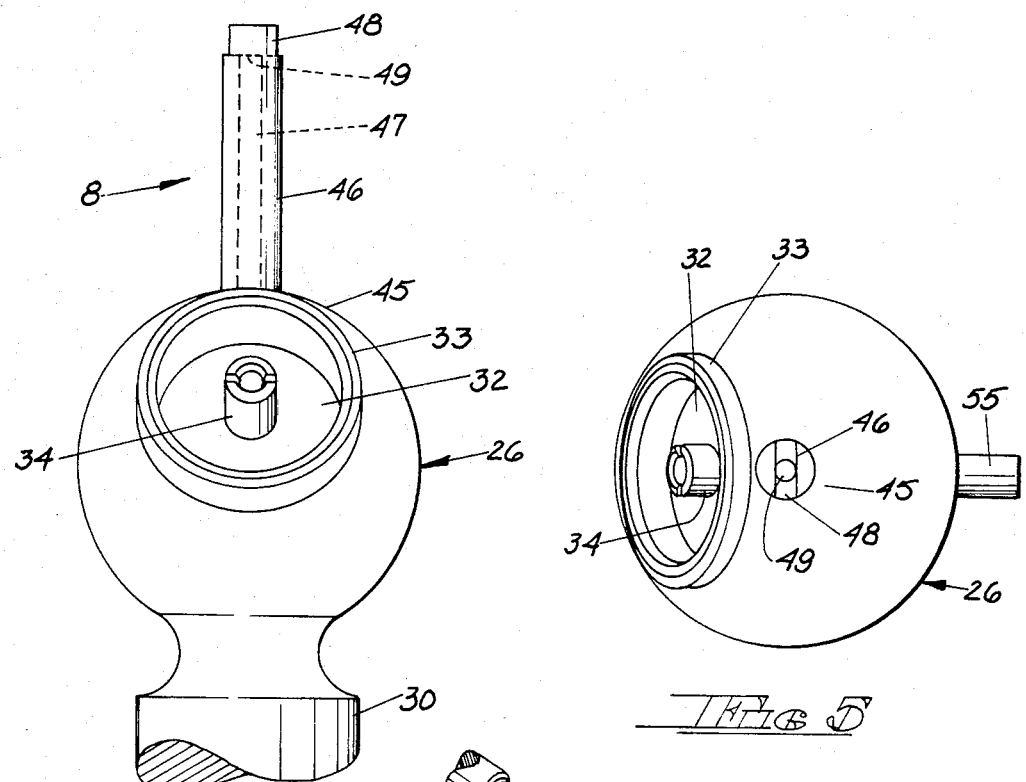
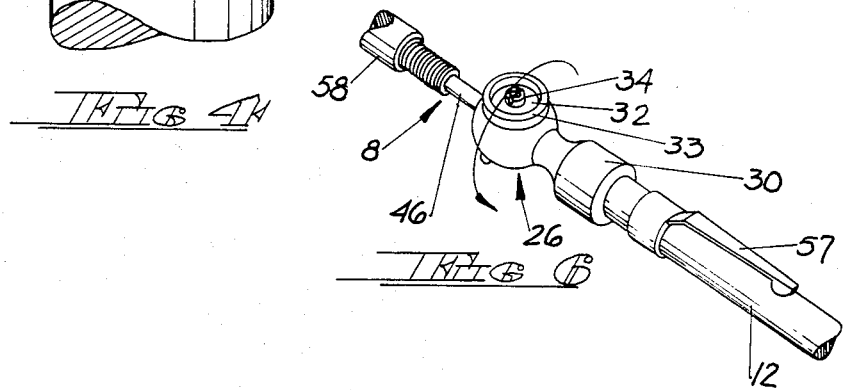
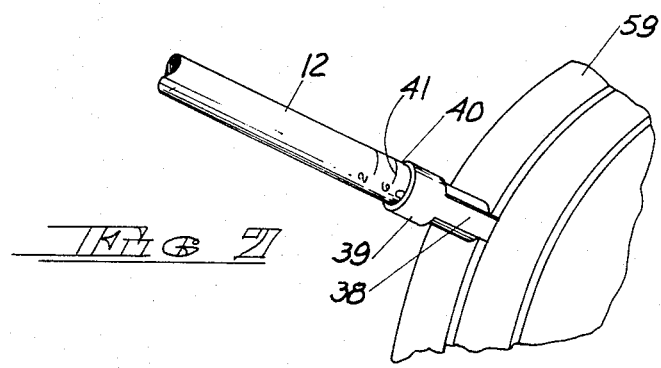

MULTI-FUNCTIONAL TIRE TESTING TOOL

SUMMARY OF THE INVENTION

The present invention relates to tire testing tools and, more particularly, to a tire testing tool capable of measuring the pressure and tread depth of a pneumatic tire as well as removing or inserting a stem core in a tire valve.

Automobile service attendants, professional mechanics and home mechanics often need to ascertain various tire conditions. The individual checking the typical pneumatic tire on an automobile desires to determine quickly and accurately the tire pressure and the tire tread depth in order to insure the continued safe operation of the vehicle. While performing these routine maintenance steps the individual often needs to remove and replace a defective stem core in the tire valve.

Unfortunately, present tire checking devices fail to provide to the attendant, professional mechanic, or home mechanic one instrument capable of easily and efficiently performing the necessary safety checks and repairs on the vehicle tire. Rather, typical pneumatic tire testing apparatus are tools capable of performing only one particular test or operation on a tire. These tools are unable to be multifunctionally used in testing and repairing the tire. Typically, the service station attendant or mechanic must carry with him a variety of tire tools when servicing each vehicle. However, in the usual work situation, the attendant often misplaces or becomes separated from these tools while hurriedly trying to service a number of automobiles. Unless he carries a number of instruments and tools on his person at all times, he often must spend valuable time either looking for a particular tool or foregoing the necessary tire inspection.

To eliminate these inherent problems presented by prior art tire testing tools, the multi-functional tire testing tool of the present invention provides a specially designed testing device capable of measuring both the tire pressure and tread depth of a pneumatic tire as well as being able to remove an replace defective tire stem cores. The tire testing device of the present invention allows the service person to perform the requisite inspection and repair of the tire without carrying with him a multitude of tools. By having one tool which measures the tire pressure and tread depth as well as being capable of removing and replacing defective stem cores, the service station attendant avoids wasting costly time looking for misplaced tools. Similarly, by carrying with him the testing device of the present invention, he no longer has to forego a safety required tire inspection due to the misplacement of a particular testing tool since all of the typically needed testing devices are provided in the single tool of the present invention.

In the preferred embodiment the present invention a conventional tire pressure gauge is provided of the type having an elongated cylindrical body with a hollow interior. A pressure indicator slide bar is telescopically located within the hollow interior and is extendable and retractable from the open bottom end of the cylindrical body. A tire valve and valve stem engaging head is attached to the top end of the cylindrical body. A cup and spring mechanism is positioned within the hollow interior of the cylindrical body for communication between the tire valve engaging head and the pressure indicator slide bar. A bottom guide having an opening therein fits into the open bottom end of the cylindrical body to guide the pressure indicator bar in and out of the hollow interior. A tire tread depth checker is positioned on the exterior of the cylindrical body near the bottom end thereof. The tread depth checker has an indicator probe slidably engaging the cylindrical body. A linear scale on the cylindrical body cooperates with the indicator probe to provide a measurement of the tread depth thickness. A stem core removing element is attached to the tire engaging head. The stem core removing element comprises a rod-like element with an axial bore for receiving the upper portion of the tire stem and a slot at the bore opening to receive the tire stem shoulder. Further details of the present invention will become apparent from a study of the following specifications, drawings and claims.

BRIEF DESCRIPTION OF THE DRAWINGS

FIG. 1 is a front perspective view of the multi-functional tire testing tool of the present invention.

FIG. 2 is a side cross-sectional view of the present invention.

FIG. 3 is a bottom view of the present invention.

FIG. 4 is a front view of the top portion of the present invention.

FIG. 5 is a top view of the present invention.

FIG. 6 is a perspective view of the present invention in an operational position removing a tire stem core.

FIG. 7 is a perspective view of the present invention in an operational position determining the tire tread depth.

DESCRIPTION OF THE PREFERRED EMBODIMENT

Referring now to FIGS. 1 and 2, the multi-functional tire testing tool 5 of the present invention is shown. The tire testing tool 5 includes a pressure gauge assembly 6 for checking the pressure of a pneumatic tire, a tire tread depth checker 7 for determining the tread thickness of a tire, and a stem core removing element 8 for removing and replacing defective stem cores from a tire valve.

The pressure gauge assembly 6 is similar to a conventional tire gauge assembly commonly used in the art to measure the tire pressure of a pneumatic tire. The pressure gauge assembly 6 has an elongated cylindrical body 12. The elongated cylindrical body 12 has a hollow interior 13. The cylindrical body 12 also has a top end 14 and a bottom end 15. Typically, the cylindrical body is approximately 4½ inches to 5½ inches in length with a diameter of approximately ¼ to ½ inch. Preferably, the cylindrical body 12 is manufactured from brass, but other metals and plastics also may be used.

A pressure indicator slide bar 20 telescopically fits within the hollow interior 13 of the cylindrical body 12 through the bottom end 15 of the cylindrical body 12. The slide bar 20 has a linear scale 21 printed thereon from which the pressure of the tested tire can be read. Also located within the hollow interior 13 of the cylindrical body 12 is a rubber cup 22 and a spring 23. The spring extends the length of the cylindrical body 12, and it surrounds the slide bar 20. The rubber cup 22 rests within the top end 14 of the cylindrical body 12 against the adjacent end of spring 23. A bottom guide 24 with an opening 25 frictionally engages the slide bar 20 and fits into the bottom end 15 of the cylindrical body 12. Preferably, the bottom guide 24 is made from a plastic.

The tire valve engaging head 26 is attached to the top end 14 of the cylindrical body 12 by a threaded base 30 which screws onto the corresponding threads 31 on the cylindrical body 12. As shown in FIGS. 2 and 4, the tire engaging head 26 has a cavity 32 with a circular lip 33 and a pressure pin 34 located centrally within the cavity 32 which engages the tire valve stem and shifts it to its open position to determine the tire pressure. A passage 35 within the tire valve engaging head 26 directs air under pressure from the tire to the rubber cup 22 within the top end 14 of the cylindrical body 12. The rubber cup 22 is shifted by the pressurized air from the tire, against the action of spring 23, toward the bottom end of the gauge cylindrical body, shoving the pressure indicator slide bar 20 partway out of the bottom end 15 of the cylindrical body 12 in accordance with the amount of air pressure acting on rubber cub 22 to reflect on the linear scale 21 of the slide bar 20 the air pressure of the tire.

The tire tread depth checker 7 is slidably attached to the the cylindrical body 12 near the bottom end thereof. The depth checker 7 comprises an indicator probe 38 and appropriate means to slidably mount the indicator probe 38 to the cylindrical body 12. For purposes of an exemplary showing, the indicator probe 38 is shown as having a clip portion 39 comprising an integral one-piece part of the indicator probe 38. The clip portion 39 is in the form of a resilient split ring which frictionally engages cylindrical body 12. Preferably, the indicator probe 38 and the bottom guide 24 are rounded off approximately ⅛ inch at each end to provide a smooth fit into the hollow interior 13 of the cylindrical body 12. The indicator probe 38 and clip portion 39 are made from any appropriate relatively sturdy and resilient material such as steel, aluminum, or plastic. Preferably, the indicator probe 38 is made from a spring steel, and it is approximately 1.5 inches in length with a width of approximately ⅛ inch. However, other lengths and widths likewise would be operable within the scope of the invention.

Along the bottom portion of the cylindrical body 12 is a linear scale 40 which has indicia 41 to reflect the tire tread depth as measured by positioning the indicator probe 38 within the tire treads. The indicia 41 of linear scale 40 are positioned so that the indicator 38 and linear scale 40 cooperate to provide a measurement of the tire tread thickness. To obtain an accurate measurement, the indicator probe 38 is slid to its fully extended position with its clip portion 39 near the bottommost end of cylindrical body 12. The free end of the probe 38 is inserted in the groove between two adjacent tire treads until its free end abuts the bottom of the groove. The cylindrical body 12 is then shoved downwardly until its bottommost portion abuts one or both of the adjacent treads. This causes the clip portion 39 of indicator 38 to slide upwardly along cylindrical body 12 until the cylindrical body bottom end abuts the tread or treads. The final position of the upper edge of clip portion 39 on scale 40 corresponds to the tire tread depth. The linear scale 40 may be engraved onto the cylindrical body 12.

A stem core removing and replacing element 8 is attached to the top portion 45 of the tire valve engaging head 26. The stem core removing element 8 comprises a rod-like member 46 extending substantially vertically from the top portion 45. The rod-like member 46 has an axial bore 47 which receives the upper portion of the tire stem pin. Preferably, the rod-like member 46 extends directly vertically from the top portion 45 so that the axial bore 47 is co-axial with the cylindrical body 12. A slot 48 extends across the bore opening 49 at the free end of the rod-like member 46. The rod-like member 46 has a diameter of approximately ⅛ to ¼ inch with 5/32 inch being preferred. The diameter of the internal bore 47 is approximately 1/16 inch. The width of the slot 48 is approximately ⅛ inch. Preferably, the valve engaging head 26 is made of stainless steel and the rod-like member 46 is machined integral with the head 26.

In use, the rod-like member 46 is inserted into the valve of the tire so that the pin of the valve is received within the bore 47 of the rod-like member 46. The slot 48 of the rod 46 engages the shoulder conventionally located on the tire stem valve. By gripping the cylindrical body 12 in the hand and turning the cylindrical body 12 and consequently the rod-like member 46 in a counterclockwise direction, the stem core can be removed from the tire valve. Conversely, by turning the cylindrical body 12 and rod 46 in a clockwise direction, the stem core can be tightened in the tire valve. The length of the cylindrical body 12 attached to the rod-like member 46 allows greater leverage and torque to be provided to the rod 46 which allows for the easier removal and replacement of the stem core valves.

Additionally, a short stem or knob 55 is provided on the rear portion 66 of the tire valve engaging head 26. The stem or knob 55 can be inserted into the tire valve to release excess air pressure within the tire as indicated by the pressure gauge assembly 6. A pocket clip 57 can also be provided on the cylindrical body 12 so that the tool 5 can be conventionally stored in a shirt pocket during nonuse.

As used herein and in the claims, words such as "top", "bottom", etc. have been used for clarity, in conjunction with the drawings. It will be apparent to one skilled in the art that the device of the present invention can be used in any appropriate attitude depending upon the work being performed.

What is claimed is:

1. An improved conventional tire gauge of the type having an elongated cylindrical body and a hollow interior, the cylindrical body having a top and a bottom end, a pressure indicator slide bar being telescopically located within the hollow interior through the bottom end of the cylindrical body, a tire valve engaging head being attached to the top end of the cylindrical body, a cup and spring mechanism coacting within the hollow interior of the cylindrical body for communication between the tire valve engaging head and the pressure indicating slide bar, a bottom guide having an opening fitting into the bottom end of the cylindrical body for guiding the pressure indicator slide bar in and out of the hollow interior of the cylindrical body, wherein the improvement comprises (a) a tire tread depth checker positioned on the bottom end of the cylindrical body, the tire tread depth checker having an indicator probe positionable between the tire treads, the indicator probe slidably engaging the cylindrical body, a linear scale on the cylindrical body cooperating with the indicator probe to provide a measurement of the tire tread thickness;

(b) an element for removing a conventional tire stem core of the type having a pin and a shoulder, a stem core removing element attached to the tire valve engaging head and having a free end, the stem core removing element comprising a rod like element with an internal axial bore for receiving the tire stem pin, the bore having a slot extending across the bore opening at the free end of the rod like element for engaging the tire stem shoulder, whereby a multi-functional tire tester is provided capable of measuring tire pressure and tread depth and removing and replacing a tire stem core.

2. The improved conventional tire gauge as described in claim 1, wherein the tire valve engaging head has a top portion, the stem core removing element being attached substantially vertically to the top portion of the tire valve engaging head.

3. The improved conventional tire gauge as described in claim 1, wherein the internal bore of the rod-like member is substantially co-axial with the cylindrical body.

4. An improved conventional tire gauge as described in claim 1, wherein the linear scale is engraved onto the cylindrical body.

5. The improved conventional tire gauge as described in claim 1, wherein the indicator probe of the tire tread depth checker has clip portion frictionally engaging the cylindrical body.

6. An improved conventional tire gauge of the type having an elongated cylindrical body and a hollow interior, the cylindrical body having a top and a bottom end, a pressure indicator slide bar being telescopically located within the hollow interior through the bottom end of the cylindrical body, a tire valve engaging head being attached to the top end of the cylindrical body, a cup and spring mechanism coacting within the hollow interior of the cylindrical body for communication between the tire valve engaging head and the pressure indicating slide bar, a bottom guide having an opening fitting into the bottom end of the cylindrical body for guiding the pressure indicator slide bar in and out of the hollow interior of the cylindrical body, wherein the improvement comprises (a) a tire tread depth checker positioned on the bottom end of the cylindrical body, the tire tread depth checker having an indicator probe positionable between the tire treads, the indicator probe slidably engaging the cylindrical body, a linear scale on the cylindrical body cooperating with the indicator probe to provide a measurement of the tire tread thickness.

7. An improved conventional tire gauge as described in claim 6, wherein the linear scale is engraved onto the cylindrical body.

8. The improved conventional tire gauge as described in claim 6, wherein the indicator probe of the tire tread depth checker has clip portion frictionally engaging the cylindrical body.

9. An improved conventional tire gauge of the type having an elongated cylindrical body and a hollow interior, the cylindrical body having a top and a bottom end, a pressure indicator slide bar being telescopically located within the hollow interior through the bottom end of the cylindrical body, a tire valve engaging head being attached to the top end of the cylindrical body, a cup and spring mechanism coacting within the hollow interior of the cylindrical body for communication between the tire valve engaging head and the pressure indicating slide bar, a bottom guide having an opening fitting into the bottom end of the cylindrical body for guiding the pressure indicator slide bar in and out of the hollow interior of the cylindrical body, wherein the improvement comprises:

an element for removing a conventional tire stem core of the type having a pin and a shoulder, a stem core removing a conventional tire stem core of the type having a pin and a shoulder, a stem core removing element attached to the tire valve engaging head and having a free end, the stem core removing element comprising a rod like element with an internal axial bore for receiving the tire stem pin, the bore having a slot extending across the bore opening at the free end of the rod like element for engaging the tire stem shoulder, said head having a top portion, the stem core removing element being attached substantially vertically to the top portion of the tire valve engaging head, the axial internal bore of the rod-like member being substantially co-axial with the cylindrical body, whereby a multi-functional tire tester is provided capable of measuring tire pressure and removing and replacing a tire stem core.

* * * * *